United States Patent [19]

Moodie et al.

[11] 3,903,535

[45] Sept. 2, 1975

[54] MAGAZINE CAMERA

[75] Inventors: Donald E. Moodie, Marblehead; Donald J. Sulesky, Arlington, both of Mass.

[73] Assignee: Polaroid Corporation, Cambridge, Mass.

[22] Filed: June 17, 1974

[21] Appl. No.: 479,862

[52] U.S. Cl. .............................. 354/174; 354/182
[51] Int. Cl. ............................................ G03b 19/10
[58] Field of Search ............................ 354/174, 182

[56] References Cited
UNITED STATES PATENTS
478,780    7/1892    Bristol ............................. 354/182
541,188    6/1895    Tournier ........................... 354/174

Primary Examiner—John M. Horan
Attorney, Agent, or Firm—John W. Ericson

[57] ABSTRACT

A magazine camera back comprising a film pack magazine and pack changing mechanism and a self-processing camera back in which exposed film units are processed by passing them between a pair of rolls under pressure. A carriage carries the rolls into and out of engagement with a drive train, and a mechanism is included for registering the rolls with the drive train.

18 Claims, 9 Drawing Figures

MAGAZINE CAMERA

This invention relates to photographic apparatus, and particularly to a novel film pack magazine and pack-changing mechanism for self-processing cameras.

The Polaroid SX–70 Land camera is an automatic, single lens reflex camera manufactured and sold by Polaroid Corporation of Cambridge, Mass. A particular embodiment of this camera is shown and described, for example, in U.S. Pat. No. 3,714,879, issued on Feb. 6, 1973 to Edwin H. Land, Igor Blinow and Vaito K. Eloranta for REFLEX CAMERA, and assigned to the assignee of this application. As there more fully shown and described, the camera is a fully automatic single lens reflex that is foldable into a thin compact shape. When erected, and supplied with a cassette including film units and a battery, the camera responds to the touch of a button to produce a photograph that is immediately driven out of the camera, and there procedes to complete its development.

In the process of making an exposure in a camera of the kind described, the shutter is closed and the reflex mirror system is moved from a viewing position to an exposure position. The shutter is then opened, and a photoelectrically determined exposure is made on the outermost film unit in the cassette. The shutter is then closed, and a pick is actuated to advance the exposed film unit into engagement with a pair of processing rolls mounted at the front of the camera. The film unit is driven through the processing rolls under pressure to distribute a supply of film processing composition throughout a photosensitive laminar system in the film unit. The reflex mirror system is then turned to its viewing position, and the shutter is opened.

When the supply of film units in a cassette of the kind described has been exhausted by taking photographs in the manner described above, a bed at the front of the camera is dropped down by the release of a latch, and the empty cassette is pulled out of the camera by means of a flexible tab attached to the front of the cassette. To allow this to be done, the processing rolls are carried on the bed, and the gearing through which they are driven is interrupted, two of the drive gears being swung away with the bed from the remaining gears of the drive train.

The camera and mode of operation just described are well suited for amateur photography and many professional purposes. However, for a number of industrial and commercial applications, it would be desirable to use the basic film positioning and processing mechanism of the camera to expose and process a relatively large number of film units without the necessity for manually changing cassettes each time one was exhausted. Such applications include identification photography, where it is desired to take a large number of pictures rapidly because a number of people may be waiting in a line for that purpose; press photography; studio portraiture; automatic photostudio photography, where the camera is left unattended for a period of time; location portraiture, such as the taking of portraits for school yearbooks and the like; and industrial applications in which it is desired to take a number of pictures rapidly, as in consequence photomicrography, the analysis of operation sequences, or the like.

Various approaches to the solution of this problem have been proposed. For example, in U.S. application for Letters Patent Ser. No. 321,668, filed on Jan. 8, 1973 by C. Bruce Kennedy and John F. Pasieka for COMPACT AUTOMATIC PHOTOSTUDIO, and assigned to the assignee of this application, a photostudio is disclosed utilizing a camera made to accept film units of the kind described. The camera is adapted to employ special cassettes each containing a larger number of film units. The number of film units to be packaged in this way can easily be selected for a particular application, such as for a photostudio. However, for more general application, the approach is somewhat inflexible, in that whereas for one purpose, twenty film units might be the right number, for another it might be one hundred.

In U.S. application for Letters Patent Ser. No. 321,667, filed on Jan. 8, 1973 by C. Bruce Kennedy for AUTOMATIC PHOTOSTUDIO COMPRISING AUTOMATIC FILM CASSETTE CHANGING APPARATUS, and assigned to the assignee of this application, another solution is proposed. There, a photostudio is shown that incorporates a camera having a magazine for film cassettes and a changing mechanism. The changing mechanism is adapted to load and remove cassettes from the exposure station from the bottom, leaving the processing rolls in position in the front of the exposure station. This is a somewhat more flexible system, in that it handles standard cassettes containing ten film units each, and the user can selects his requirements in multiples of ten. However, the apparatus does not especially lend itself to incorporation in a portable camera. It is a principle object of this invention to provide a film processing and cassette changing mechanism suitable for either portable or stationary cameras, comprising a magazine that will accept a number of cassettes and means for rapidly loading and unloading an exposure chamber with cassettes from the magazine.

Briefly, the above and other objects of the invention are attained by a novel camera construction comprising as one basic component, a camera back. The camera back comprises a housing, adapted to contain a cassette of self-processing film units, and formed with a framing aperture in position to expose the uppermost film unit in the cassette.

The bottom of the housing is formed with an opening, over roughly half its length. This opening communicates with a magazine adapted to contain a plurality of cassettes and serves as a loading port.

An extractor mechanism is provided that comprises a slide connected to an extension mechanism mounted on the sides of the housing. The slide is formed with a grip so that it can be reciprocated. The slide carries an extraction mechanism, which, upon reciprocation of the slide from a home position to an extended position and back again, extracts an empty cassette from the housing and loads a new cassette from the magazine into the housing. Processing rolls are carried on a carriage mounted on the slide for limited movement relative thereto, and means are provided for accurately registering the processing rolls with the cassette when the slide is in its home position. For installations where automatic operation is desired, a motor may be attached to the housing. Drive means are connected between the motor and the slide to reciprocate the slide automatically, whereby automatic cassette changing can be accomplished, if so desired.

The apparatus of the invention, and its mode of operation, will best be understood in the light of the following detailed description, together with the accompanying drawings, of a preferred embodiment thereof.

Figure 1:
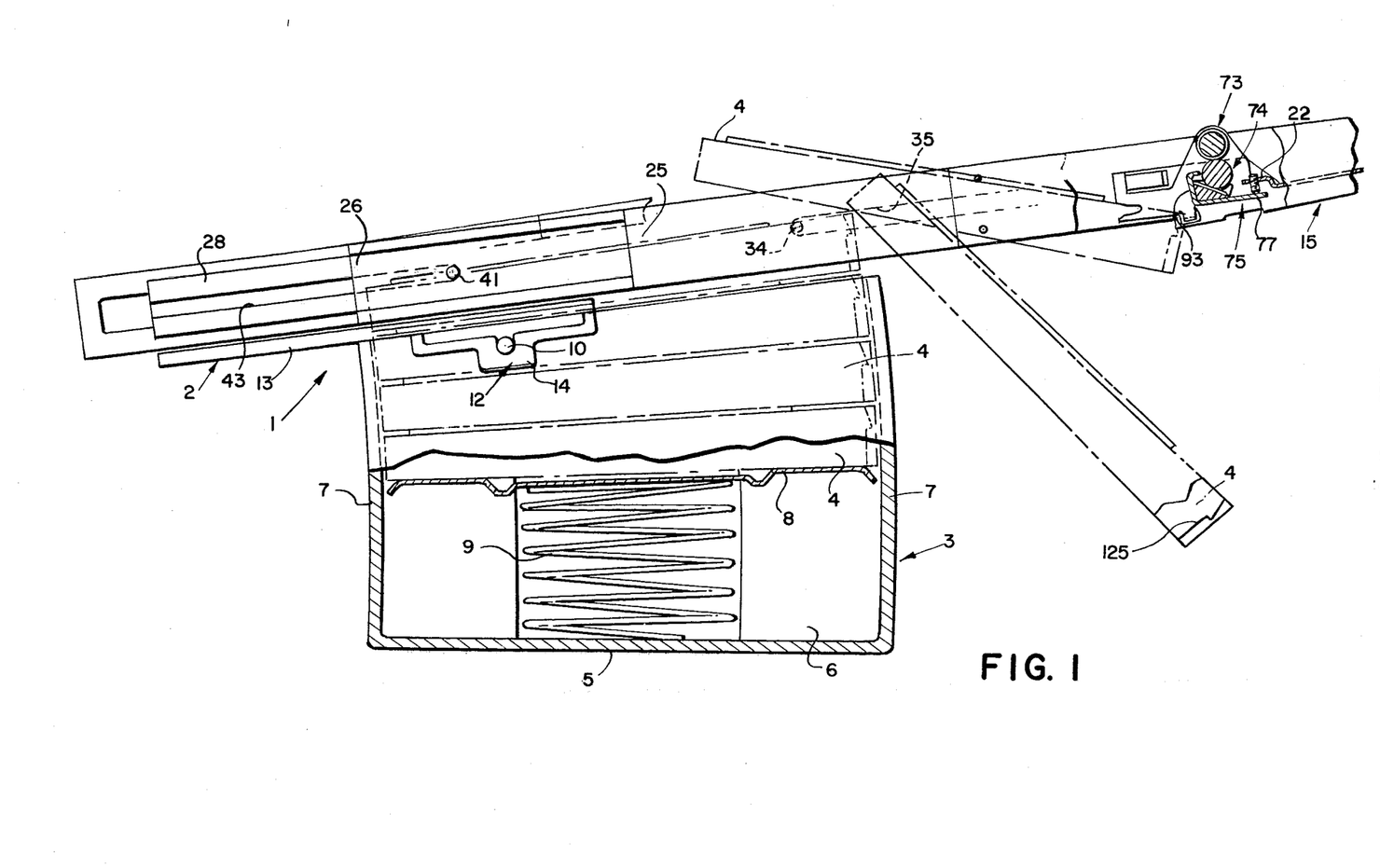
FIG. 1 is schematic elevational sketch, with parts shown in cross-section, parts omitted and parts broken away, of a magazine camera back in accordance with the invention.

FIG. 1 shows a magazine camera back generally designated 1 comprising a film positioning and cassette changing mechanism generally designated 2 detachably connected to a cassette magazine generally designated 3. The magazine 3 is adapted to contain any desired number, such as ten, of film containing cassettes 4. While the cassettes 4 may take any suitable conventional form, they are preferably of the type manufactured and sold as Polaroid SX-70 Land film packs. Each cassette 4 of this type contains ten self-processing film units, and a battery which is normally employed to operate the Polaroid SX-70 Land camera. Whether or not this battery is used to operate the apparatus of this invention is optional; as will appear, means are provided for making connection to it, but these may be used or not in accordance with the particular purpose for which the mechanism is to be used.

As shown in FIG. 1, the magazine 3 comprises a container that is open at the upper end and closed at the bottom by a wall 5. Flat side walls may be provided as indicated at 6, but the end walls 7 are preferably curved as shown, because the Polaroid SX-70 film cassette is essentially trapezoidal in elevation, and such cassettes form a curved stack. The lowermost cassette 4 is supported by a bed plate 8, of sheet metal or the like, urged upwardly by a conventional spring 9.

Figure 6:
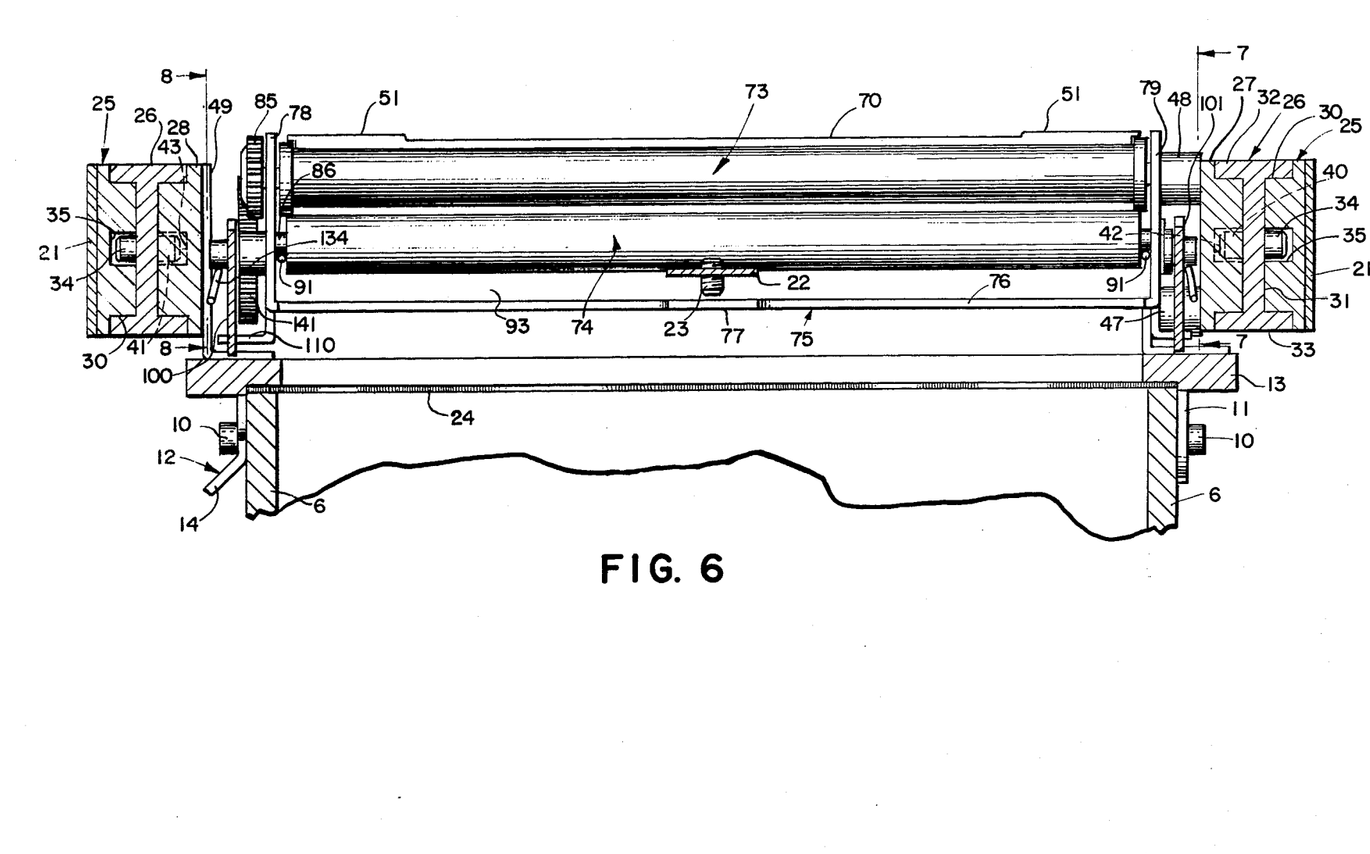
FIG. 6 is a schematic cross-sectional elevational view, with parts omitted and parts broken away, showing a portion of the apparatus of FIG. 2 on an enlarged scale, and taken substantially along the lines 6—6 in FIG. 2.

As best shown in FIGS. 1 and 6, the magazine 3 is detachably secured to and registered with the camera back and changing mechanism 2 by means of a pair of pins 10 secured to the side walls 6 of the magazine 3, and a cooperating pair of depending ears 11 and 12. As best shown in FIG 6, the ears 11 and 12 are fixed to a housing frame 13 forming a part of the camera back and changing mechanism 2. The ear 12 is resilient, and bent outwardly as indicated at 14 so that it can be grasped and bent away from its connection to the pin 10, allowing the magazine to be removed. As suggested in FIG. 6, a light seal in the form of black light absorbent felt or flocking 24 may be cemented to the frame 13 to make a lighttight connection between the magazine and the camera back.

Figure 2:
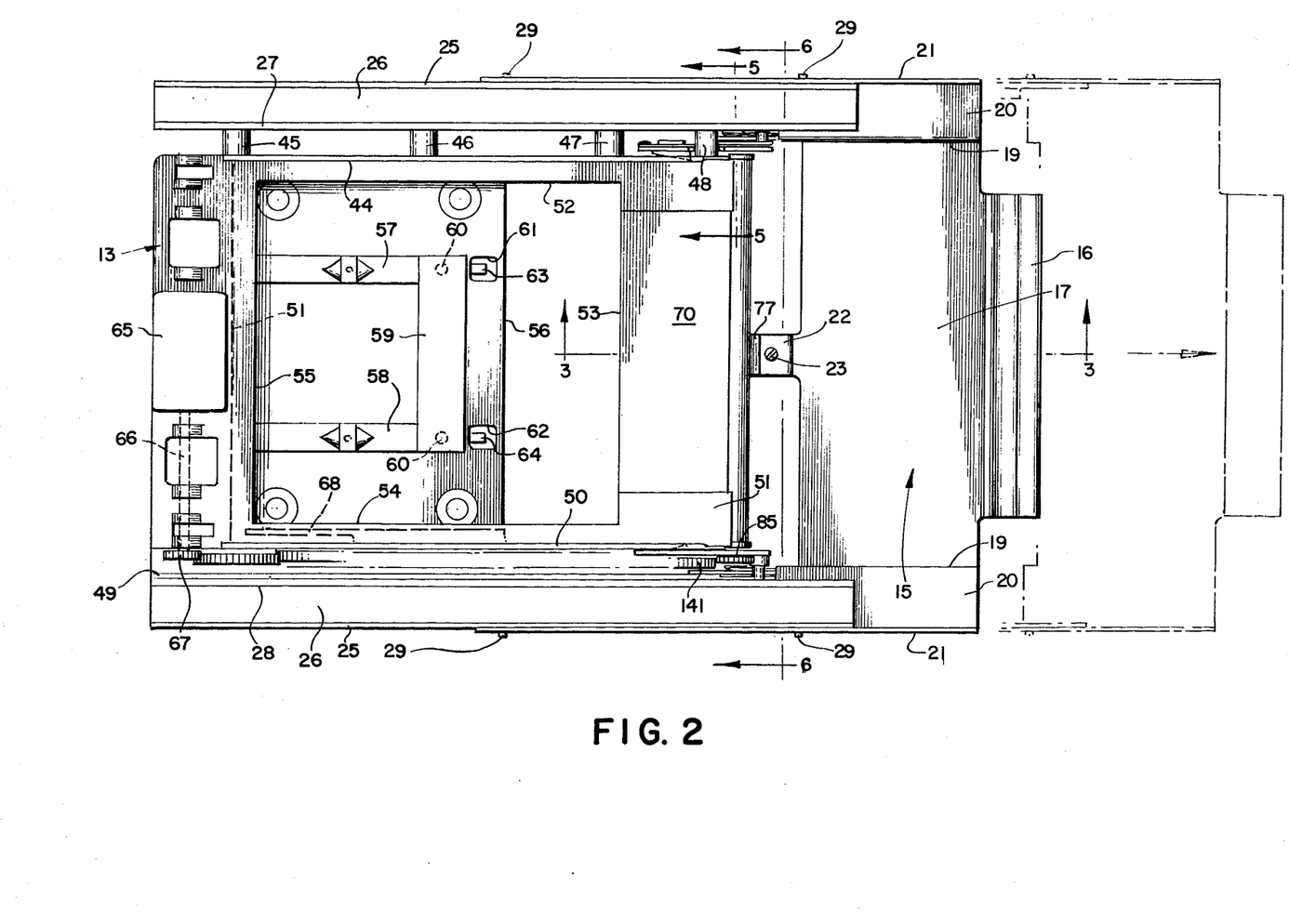
FIG. 2 is a plan view of the apparatus of FIG. 1, with the magazine removed and the slide shown in its home position.
Figures 3, 4, 5:
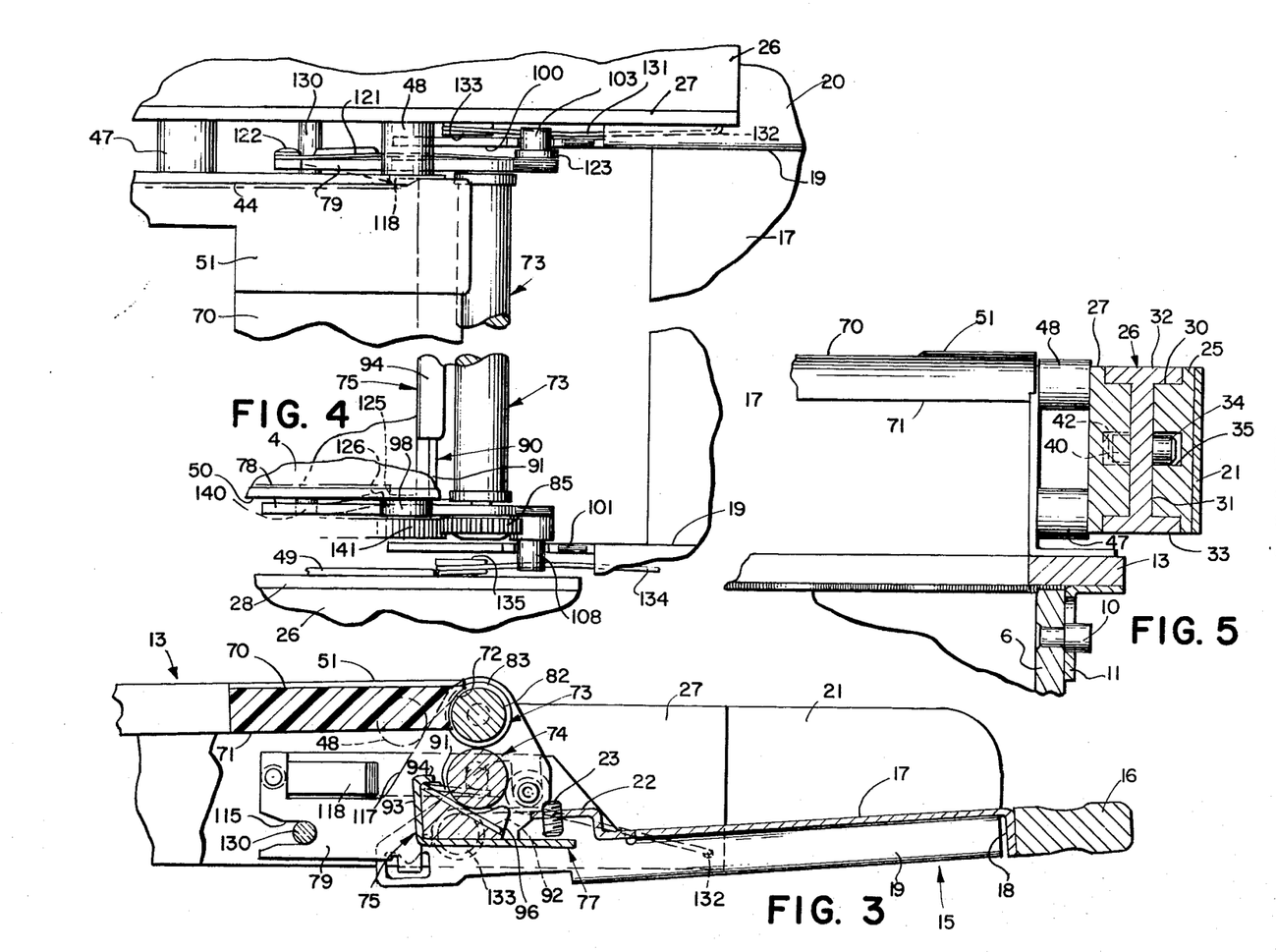
FIG. 3 is a schematic fragmentary elevational sketch, with parts shown in cross-section and parts broken away, of a portion of the apparatus of FIGS. 1 and 2 taken substantially along the lines 3—3 in FIG. 2, but on an enlarged scale.
FIG. 4 is a fragmentary enlargement of portions of the apparatus of FIG. 2, showing the mounting means for the processing rolls in somewhat more detail.
FIG. 5 is a fragmentary elevational sketch, with parts broken away, parts shown in cross-section, and on an enlarged scale, taken substantially along the lines 5—5 in FIG. 2.

Referring to FIGS. 2 and 3, the camera back and changing mechanism comprises a slide generally designated 15 formed at one end with a handle 16, preferably molded of plastic or the like, and secured in any desired manner to a plate 17, as by fastening with screws to an end flange 18 formed on the end of the plate 17 as shown in FIG. 3.

As shown in FIGS. 2 and 3, the plate 17 is bent down at the sides to form walls 19, and is then bent again at right angles to form extensions 20 formed integral with parallel side walls 21 that extend normal to the extensions 20. A central extending portion, at the left side of the plate 17 as seen in FIG. 2, is bent upwardly and then over to form a tab 22. An adjustment screw 23 is threaded in the tab 22 for purposes to appear.

The side walls 21 of the slide 15 are connected to parallel outer rails 25 of an extension arm assembly that further comprises central rails 26 and inner rails 27 and 28. The walls 21 may be fixed to the rails 25 by any suitable means, suggested in FIG. 2 as pins 29.

Comparing FIGS. 1 and 6, each of the rails 25 has a central rib portion 30 that slides on the central web portion 31 of each of the middle rails 26 under the guidance of flanges 32 and 33 formed at the top and bottom of each of the rails 25. As shown in FIGS. 1 and 6, a forward pin 34 is fixed in the central web 31 of each of the rails 26 and extends outwardly therefrom. These pins 34 are received in slots 35 formed in the ribs 30 of each of the rails 25. As indicated in FIG. 1, the ends of the slots 35 engage the pins 34 to stop the rails 25 in the outermost extended position of the slide 15.

In a similar manner, as shown in FIGS. 1 and 6, pins 40 and 41, affixed to the webs 31 of the inner rail 26 as shown in FIG. 6, cooperate with slots 42 and 43, respectively, formed in the inner rails 27 and 28, respectively. By this arrangement, upon reciprocation of the slide 15, the extension assembly is capable of moving from the closed, or home, position shown in FIG. 2 to the open, or extended, position shown in FIG. 1.

The inner rail 27 of the extension assembly just described is secured to a side wall 44 formed integral with the frame 13 by posts 45, 46, 47 and 48, as best shown in FIG. 2. The inner rail 28 is secured by any suitable conventional means, not shown, to a wall 49 that is in turn secured by any conventional means to the frame 13.

The particular form of camera back shown was made by cutting away portions of the housings of a Polaroid SX-70 Land camera. As will be apparent to those skilled in the art, certain of the features shown are incidental to that adaptation, and can be omitted if so desired. However, the features shown are all useful for certain purposes to which the apparatus may be put, and may be retained if desired.

In particular, the frame 13, which may be molded from any suitable thermoplastic resin or the like, comprises a housing that forms a compartment that is adapted to receive a cassette containing film units, such as the cassettes 4 in FIG. 1. A cassette in this compartment is confined at the sides by a side plate 50, secured to the frame 13 in any conventional manner, and by the side wall 44. The cassette is stopped at the end by an end wall 51 formed on the frame 13. The cassette is confined at the top by the lower surface 71 of a wall 39 formed integral with the frame 13 and cut away as indicated at 52, 53, 54 and 55 to form a framing aperture through which a film unit in the cassette receiving chamber can be exposed. As best shown in FIGS. 2 and 6, the central portion 70 of the top wall is of reduced thickness, forming a guide channel for use in aligning any desired optical housing to be connected to the camera back to form a complete camera. At the bottom, the rear end of the cassette is confined by a bottom wall 56 that may be a metal plate formed integral with side wall plates 44 and 50 as a generally U-shaped member.

A pair of spaced and mutually insulated contacts 57 and 58 are mounted on the bottom wall 56, and there secured in any suitable fashion, here suggested as by a plastic bar 59 heat staked to the bottom wall 56 as by portions 60 protruding through suitable apertures in terminals 57 and 58. The terminals 57 and 58 are adapted to cooperate with the terminals of a battery such as provided in the Polaroid SX–70 Land film pack.

The terminals 57 and 58 extend through suitable apertures 61 and 62 to ends 63 and 64, respectively, which are adapted to be connected to any operating circuitry which the user desires. In particular, energy from a battery in a cassette in the exposure position can thus be taken from the terminals 63 and 64 to energize a motor 65 mounted in a suitable recess in the frame 13.

The motor 65 has a shaft 66 adapted to drive the input gear 67 of the drive train provided as in the Polaroid SX–70 Land camera to drive processing rolls, and to provide energy for moving a pick 68 in the manner described in the above-cited application. The purpose of the pick 68 is to advance the film unit in the cassette that is in the exposure position out of the cassette and into engagement with processing rolls, to be described.

The reduced portion 70 of the top wall 39 extends across the front of the base plate 13. Comparing FIGS. 1, 2, 3, 4, and 5, the lower surface 71 of the wall 39 serves to register the top surface of a cassette located in the well formed in the base plate 13. The end of the top wall 39 is curved, as shown at 72 in FIG. 3, to clear an adjacent processing roll generally designated 73, to be described below.

The processing roll 73, and a companion processing roll 74 mounted just below it as shown in FIGS. 3 and 6, are journalled for rotation about parallel axes in a carriage that is carried with a lost motion connection by the slide 15, in a manner next to be described. The carriage carrying the rolls 73 and 74 comprises a frame generally designated 75, of sheet metal or the like, having a base portion 76 extending across below the rolls and formed with a tab 77, as best shown in FIGS. 2 and 6, which underlies the tab 22 on the slide plate 17 and is at times engaged by the adjustment screw 23 for purposes to appear.

The frame 75 is bent up at the ends to form ears 78 and 79. As shown in FIGS. 6 and 7, the ear 79 is formed with a bore 80 to serve as a journal bearing for an axle 81 formed integral with roll 73. As indicated in FIG. 3, the roll 73 may comprise an inner cylindrical stainless steel cores 82, covered with polyurethane or the like as shown at 83. As indicated in FIG. 8, the opposite end of the axle 81 is journalled in a corresponding bore formed in the ear 78, and extends therethrough to a connection to a drive gear 85.

Figures 7, 8:
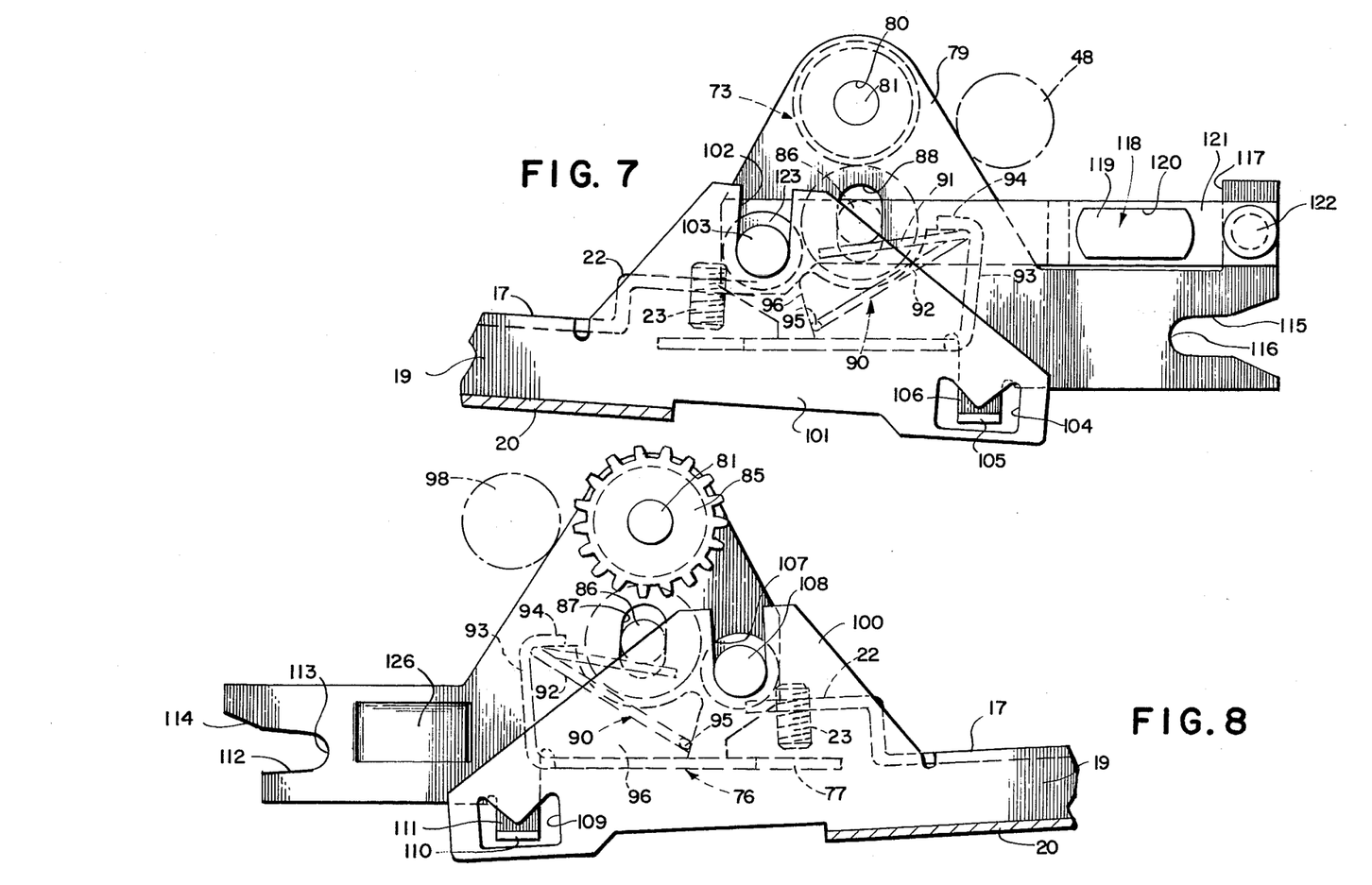
FIG. 7 is an enlarged framentary end view, with parts shown in cross-section, parts broken away, and parts omitted, taken substantially along the lines 7—7 in FIG. 6.
FIG. 8 is a schematic fragmentary end view, similar to FIG. 7 but showing the other side of the apparatus of FIG. 6 from essentially the lines 8—8 in FIG. 6.

The lower roll 74 may be of stainless steel or the like, and has an axle 86 that extends through an elongated hole 87 formed in the ear 78 and, referring to FIG. 7, to a corresponding elongated hole 88 formed in the ear 79. The holes 87 and 88 allow the axle 86 of the roll 74 to be moved upward and downward somewhat, so that the rolls 73 and 74 engage either each other, or a film unit introduced between them, under pressure afforded by a spring generally designated 90.

The carriage frame plate 75 is bent up to form a cassette engaging shoulder 93, as shown in FIG. 3, and over at the upper side of the shoulder 93 to form a lip 94. The spring 90 extends from its ends 91 along transverse portions captured by the lip 94, and thence to a central bight formed by arms 92 and a central transverse portion 95. The central bight in the spring 90 rests against a suitable groove formed in a bar 96, of plastic or the like, as suggested in FIG. 3 and 7. The spring 90 thus acts to urge the roll 74 up into engagement with the roll 73.

Arms 100 and 101, formed integrally on the side plates 19 of the slide 15, from a support for the carriage carrying the rollers 73 and 74 in a manner next to be described. Referring first to FIG. 7, the arm 101 is slotted as indicated at 102 to accept a support shaft 103 fixed to the ear 79 of the carriage frame 75. An aperture 104, relieved at the upper sides as indicated in FIG. 7, admits a dog 105 formed on an extension 106 of the ear 79.

Similarly, referring to FIG. 8, the arm 100 is slotted as indicated at 107 to admit a support shaft 108 fixed to the ear 78. A shaped aperture 109 corresponding to the aperture 104 is formed in the ear 100 to admit a dog 110 formed of an extension 111 of the ear 78.

By this arrangement, the carriage carrying the rollers 73 and 74 can move relative to the slide 15, over a limited range, for purposes to be described. It will be apparent that the carriage frame 75 is thus constrained, referring to FIGS. 7 and 8, by the shafts 103 and 108 in the slots 102 and 107, respectively, by the dogs 105 and 110 in the apertures 104 and 109, respectively, and by the adjustment screw 23.

With further reference to FIG. 8, the ear 78 is formed at its left end with a guide slot 112 tapering to a semicircular end 113 and approached by a more widely diverging portion 114 to serve to guide a locating pin into the slot 112 in a manner to appear. Similarly, referring to FIG. 7, the ear 79 is formed with an extension in which there is formed a guide slot 115 terminating at 116 in a semicircular portion adapted to receive a locating pin. Comparing FIGS. 3, 4, and 7, the arm 79 is notched as indicated at 117 to admit the tapered corner of an extractor 118. The extractor 118 has a head 119 protruding through an aperture 120 formed in a spring strip 121 as shown in FIG. 7. The strip 121, of spring steel or the like, is secured to the ear 79 by means shown in FIG. 4 as a pin 122. The other end of the spring 121 is constrained by a shoulder 123 formed on the support shaft 103 as suggested in FIGS. 4 and 7.

By this arrangement, the extractor 118 is resiliently urged downwardly, as seen in FIG. 4, and the corner of the extractor 118 is thus adapted to pass behind and catch on a ledge 125 formed on the ends of the film cassettes 4 as shown in FIGS. 1 and 4.

A corresponding extractor 126 is formed by a tab 126 and bent inwardly from a portion of the ear 78, as best shown in FIGS. 4 and 8. The extractor 126 is adapted to pass over and engage the ledge 125 on the opposite side of the cassette 4, when the apparatus is operated in a manner to be described.

Comparing FIGS. 3 and 4, the slot 115 in the ear 79 is adapted to engage a locating pin 130 secured between the side wall 44 and the inner rail 27 of the slide extension assembly. At the same time, the forward edge of the upper portion of the ear 79 engages the post 48. Similarly, the slot 112 in the ear 78 is adapted to engage a locating pin 140, and the forward edge of the upper portion of the ear 78 engages a locating post 98 (FIG. 4 and 8) secured to the side wall 50. In this manner, in the closed position of the slide 15, the carriage is positively adjusted relative to a cassette in the exposure station formed by the frame 13.

In its approach to the closed position, the carriage is resiliently raised. For this purpose, a spring 131 extends from an end 132 buried in a suitable recess in the inner rail 27, as best shown in FIGS. 3 and 4, and extends therefrom generally upwardly as seen in FIG. 3 to an end coiled about a post 133 fastened to the inner rail 27. The support shaft 103 is thus guided generally upwardly as the carriage goes to its closed position. Similarly, on the other side of the apparatus, a spring 134, corresponding to the spring 131, is mounted at one end on a post 135 at one end, the post 135 being secured to the inner rail 28 and the other end of the spring 134 extending to a connection to the rail 28, not shown, but identical to the connection 132 for the spring 131. The spring 134 guides the support shaft 108 for the ear 78 generally upwardly as the carriage is moved to its closed position.

At the same time, the gear 85 is brought into mesh with an output drive gear 141. As best shown in FIGS. 4 and 6, the gear 85 comes into mesh with the gear 141 well above the axis of rotation of the latter, so that any misregistration of the gear teeth is corrected without a jamming of the parts. As suggested in FIG. 2, the output gear 141 is connected to the input gear 67 of the drive train by a conventional gear train, not shown in detail, which may be the same as the drive train for the Polaroid SX-70 Land camera, shown and described in the above-cited U.S. Pat. No. 3,714,879.

Having described the construction of this embodiment of the invention, its operation will next be described. Referring to FIGS. 1 and 2, when a magazine 3 is loaded with cassettes 4 in the manner shown in FIG. 1, the uppermost cassette is stopped by the slide plate 17 when the slide is in the closed position shown in FIG. 2. When the handle 16 is grasped to move the slide 15 to its extended position, as shown in FIG. 1, the uppermost cassette 4 will move up into the opening between the shoulder 93 on the carriage plate 75, now in the position shown in FIG. 1, and the forward edge of the bottom plate 56 rising up until it is stopped by the lower surface 71 of the top wall 39.

When the slide is moved toward the position shown in FIG. 2, the shoulder 93 formed on the carriage plate 75 will engage the end of the cassette, and drive the cassette home into exposure position with its end in engagement with the end wall 51 of the well formed in the frame 13. As the slide approaches this position, the next cassette 4 in the magazine 3 will be held down, first by the cassette being driven into position above it, and next by the bed plate 17. As the parts approach the position shown in FIG. 2, the carriage passes through three stages of operation. First, referring to FIGS. 7 and 8, in the extended position of the slide, the carriage plate 75 is loose in the ears 100 and 101.

Next, referring to FIGS. 3 and 4, as the springs 131 and 134 engage the shafts 103 and 108, respectively, the carriage plate 75 is lifted until the tab 77 engages the adjustment screw 23 (FIG. 3), and the dogs 105 and 110 engage the upper surfaces of the apertures 104 and 109, respectively, (FIGS. 7 and 8). The purpose of this arrangement is to place the gear 85 in the proper relation to the output gear 141, and the slots 112 and 115 in the proper relation to the pins 130 and 140 (FIG. 4) as these parts approach engagement. The position of the carriage plate in this portion of the operating cycle can be adjusted with the adjustment screw 23.

Finally, as the ears 78 and 79 engage the pins 98 and 48, respectively, the carriage plate 75 is pushed down away from the adjustment screw 23. The parts are now in their correct operating position for driving the rolls 73 and 74, and the apparatus is in condition for an exposure cycle.

Control apparatus, not here shown but described in the above-cited patent, may be provided for energizing the motor 65 in FIG. 2 to cause one cycle of operation of the gear train as soon as a loaded cassette is in position. This action serves to advance a dark slide, such as is normally provided at the top of the cassette and covering the first film unit, out through the processing rolls. The first unexposed film unit is then in position for exposure through the optical system provided.

After each such exposure, the motor 65 would be run again to advance the exposed film unit through the rolls 73 and 74, first by movement of the pick 68 in FIG. 2 to advance the exposed film unit into the bite of the rolls 73 and 74, and then by driving the rolls to drive the film unit out of the camera while spreading processing fluid within it to cause the exposed image to be developed.

When all of the film units in the cassette have been exposed and ejected in the manner just described, the handle 16 in FIG. 3 may be grasped to pull out the slide 15. The extractors 118 and 126 engage the cassette in position and draw it out of the exposure chamber.

As the pins 130 and 140 are disengaged by the roller carriage, the carriage will rise up slightly, clearing the back end of the next cassette 4 that is trying to ride up under the slide 15. As the empty cassette 4 is withdrawn, referring to FIG. 1, it passes out over the top edge of the magazine 3, and the next cassette rides up into position, stopped by the top plate 70 in FIGS. 3 and 4. Referring again to FIG. 1, as the ejected cassette 4 moves further to the right, it will fall under its own weight, out of the grip of the extractors and down, as suggested in FIG. 1.

When the magazine 3 in the FIG. 1 is exhausted, it can be removed by simply grasping the tab 14 on the ear 12 and pulling it over the associated pin 10. The camera back and film changing mechanism can then be lifted away from the magazine, and the magazine reloaded with fresh cassettes. The number of cassettes for which the magazine can be designed to accept is variable over a considerable range. In one particular embodiment of the invention, the capacity for 10 cassettes was provided.

Figure 9:
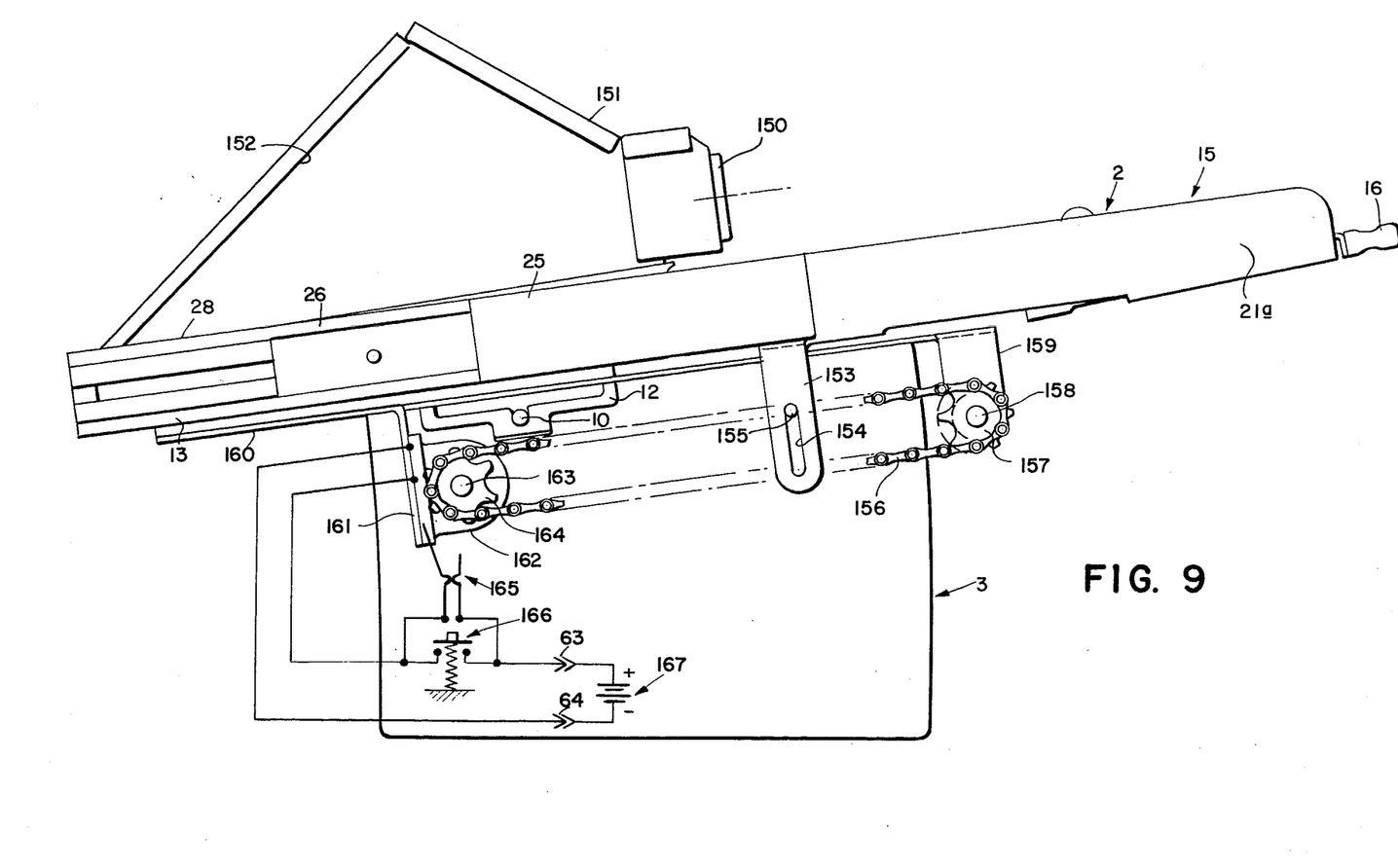
FIG. 9 is a schematic elevational sketch illustrating a complete camera incorporating the invention and provided with a motor for driving the slide for automatic operation, shown schematically in conjunction with a control circuit for the motor.

FIG. 9 shows an embodiment of the invention schematically indicated as completed in the form of a portable camera and adapted for automatic cassette changing. The apparatus of FIG. 9 may be identical with that described above in connection with FIGS. 1 through 8, with the exceptions to be noted.

The apparatus is shown quite schematically as being completed by the provision of a conventional lens and shutter mechanism 150 mounted above the camera back and changing mechanism 2 and secured thereto by a suitable light sealed housing generally schematically indicated at 151. Toward the rear of this housing 151 is provided an internal mirror 152, to direct light coming through the lens 150 down onto the framing aperture in the camera back 2. The purpose of the mirror 152 is to provide the left-to-right image reversal necessary for use with Polaroid SX-70 Land film units.

The slide 15 is adapted to be manually reciprocated by force applied to the grip 16 as described above. Alternatively, it can be automatically reciprocated. For this purpose, one of the side plates 21a formed on the slide 15 is modified to incorporate an integral dependent arm 153 formed with an elongated vertically extending slot 154. The slot 154 receives a drive pin 155 extending from a desired point along a timing chain 156.

The chain 156 is carried at one end by a sprocket 157 journalled on a shaft 158 that is affixed to an arm 159. The arm 159 is formed integrally with an extension 160 that is fixed in any conventional manner to the frame 13.

A depending portion 161 formed integrally with the plate 160 serves as a support and mounting bracket for a conventional DC motor 162. The motor 162 has an output shaft 163 on which a sprocket 164 is affixed. The sprocket 164 drives the chain 156.

As schematically indicated in FIG. 9, a limit switch 165 may be mounted in a convenient position, as on the bracket 161, to be opened by the arm 153 when the slide 15 reaches its home position, and to be closed at other times. The switch 165 is connected in a circuit between the terminal 63, shown in FIG. 2, and one terminal of the energizing winding of the motor 162. The other terminal of the winding of the motor 162 is connected to the terminal 64 in FIG. 2.

When a battery 167, such as the battery included in a film cassette of the Polaroid SX-70 Land type, is connected to the terminals 63 and 64, the motor 163 will accordingly run to drive the slide 15 until it reaches its home position, whereupon the switch 165 will open and the motor will stop unless it is given another initiating signal. Such a signal may be provided by momentarily shunting the switch 165, as with a spring returned, manually operated push button 166 as indicated in FIG. 9. Momentary closure of the switch 166 will cause the motor 162 to run even though the slide is in its home position and the switch 165 is open. The motor will thus cause the slide to be extended to its outer position, ejecting a cassette that may be in the housing, and then returning to load a fresh cassette into the camera back. Alternatively, the switch 166 may be replaced by an electronic switch to automatically close in response to the operation of a counter, in the manner disclosed in the above-cited copending U.S. application Ser. No. 321,667.

While the invention has been described with respect to the specific details of particular embodiments, many changes and variations will occur to those skilled in the art upon reading this description. Such can obviously be made without departing from the scope of the invention.

Having thus described the invention, what is claimed is:

1. A magazine camera, comprising a housing, means forming a chamber adapted to receive a cassette containing a supply of film units in said housing, means forming a framing aperture in said chamber through which a fim unit in a cassette in said chamber can be exposed, optical means comprising a lens mounted on said housing for directing image-forming light rays onto said framing aperture, means forming a loading port in said chamber adjacent one end of said chamber on a side opposite said framing aperture and adapted to receive a cassette entering said chamber, slide means reciprocably mounted on said housing for movement between a first position and a second position, magazine means adapted to contain a supply of cassettes containing film units, means for detachably connecting said magazine means to said housing adjacent said loading port, means forming a stop on said slide means adapted to hold a cassette in said magazine when said slide means is in said first position, said stop being moved out of the way of a cassette entering said loading port from said magazine means in said second position of said slide means, a carriage frame, a pair of processing rolls, means journalling said processing rolls for rotation in said carriage frame, means mounting said carriage frame on said slide means for limited movement relative to said slide means, extractor means on said carriage means adapted to engage a cassette in said chamber when said slide means is in said first position, and to withdraw said cassette from said chamber when said slide means is moved to its second position, and guide means on said housing adapted to engage said carriage means and register said carriage means in a predetermined position relative to said chamber when said slide means is in said first position.

2. A magazine camera back, comprising a housing, means forming a compartment in said housing adapted to receive a cassette containing film units, means forming a framing aperture on one side of said compartment through which a film unit in a cassette in said compartment can be exposed, means forming an opening on a side of said compartment opposite said first side toward one end thereof through which a cassette can be inserted in said compartment, means forming an opening at one end of said compartment between said first and second sides through which a cassette in said compartment can be inserted and extracted, slide means, means mounting said slide means on said housing for movement between a first position and a second position displaced along a line parallel to said first and second sides, carriage means, means mounting said carriage means on said slide means for limited movement relative thereto, a pair of processing rolls, means mounting said processing rolls for rotation about parallel spaced axes on said carriage means, a drive gear mounted on one of said processing rolls, an output gear mounted on said housing and adapted to engage said drive gear when said slide is in said first position, motor means mounted on said housing for driving said output gear, means mounted on said carriage means and adapted to engage a cassette and advance the cassette into said compartment when said slide means is moved from its second position to its first position, extractor means mounted on said carriage means and adapted to engage the cassette in said first position of said slide means to move said cassette out of said compartment when said slide means is moved toward its second position, guide means mounted on said carriage means, and means mounted on said housing and adapted to engage said guide means when said slide means is moved to its first position for moving said carriage means to a predetermined position relative to said compartment.

3. A cassette changing mechanism, comprising a housing, means forming a compartment in said housing adapted to receive a cassette, means forming an opening on one side of said housing through which one end of a cassette can be inserted, means forming an opening in one end of said housing through which a cassette can be withdrawn from said compartment, slide means, means mounting said slide means on said housing for movement between a home position and an extended position, carriage means, means mounting said carriage means on said slide means for limited movement with respect thereto, extractor means mounted on said carriage means and adapted to engage a cassette in said compartment in the home position of said slide means, a cassette engaging member mounted on said carriage means and adapted to engage a cassette and advance it into said compartment when said slide means is moved from its extended position towards its home position, a pair of processing rolls, means mounting said processing rolls on said carriage means for rotation about spaced parallel axes in position to receive a film unit advanced from a cassette in said compartment when said slide means is in said home position, guide means mounted on said carriage means, and means mounted on said housing and adapted to engage said guide means as said slide means is moved toward said home position for moving said carriage means to a predetermined position relative to said compartment.

4. Photographic apparatus, comprising, in combination, a slide, means forming a hand grip on said slide, means forming a pair of upstanding ears on said slide, means forming an open guide slot on one side of each of said ears, means forming an aperture through one end of each of said ears, a carriage comprising a generally U-shaped frame having a pair of upstanding ears adapted to fit between said ears on said slide, a pin connected too each of said ears on said carriage frame and extending through said slots on said ears on said slide, means forming a dog on each of said ears on said carriage frame, said dogs each extending through a different one of said apertures in said ears on said slide with clearance, a pair of processing rolls journalled for rotation between said ears on said carriage plate, extractor means connected to each of said ears on said carriage plate, and a slot formed in each of said ears on said carriage plate, said slots each being adapted to engage a different one of a spaced pair of locating pins and guide said carriage plate into a predetermined relation to the pins.

5. A carriage assembly for film processing and cassette changing mechanism, comprising, in combination, a frame, said frame comprising a metal plate having opposed ends bent normal to a central portion to form outstanding parallel ears, a pair of processing rolls, said rolls being mounted between said ears for rotation about spaced parallel axes normal to said ears, said ears further comprising portions extending normal to said axes, means forming open slots in said extending portions adapted to engage aligning pins, and said central portion of said plate further comprising a portion on a side facing said extension that extends normal both to said central portion and to said ears to form a shoulder adapted to engage a cassette.

6. A magazine camera, comprising a housing, means forming a chamber adapted to receive a cassette containing a supply of film units in said housing, means forming a framing aperture in said chamber through which a film unit and a cassette in said chamber can be exposed, optical image forming means mounted on said housing in position to direct image-forming light rays onto said framing aperture, means forming a loading port in said chamber adjacent one end of said chamber on a side opposite said framing aperture and adapted to receive a cassette entering said chamber, slide means reciprocably mounted on said housing for movement between a first position and a second position, reciprocating drive means connected between said housing and said slide means and operable when energized to drive said slide means from its first position to its second position and back to said first position, magazine means adapted to contain a supply of cassettes containing film units, means for detachably connecting said magazine means to said housing adjacent said loading port, a carriage frame, a pair of processing rolls, means journalling said processing rolls for rotation in said carriage frame, means mounting said carriage frame on said slide means for limited movement relative to said slide means, extractor means on said carriage means adapted to engage a cassette in said chamber when said slide means is in said first position, and to withdraw said cassette from said chamber when said slide means is moved to its second position, and guide means on said housing adapted to engage said carriage means and register said carriage means in a predetermined position relative to said chamber when said slide means is in said first position.

7. A magazine camera back, comprising means forming a housing, means forming a compartment in said housing adapted to receive a cassette containing film units, means forming a framing aperture on one side of said compartment through which a film unit in a cassette in said compartment can be exposed, means forming an opening on a side of said compartment opposite said first side toward one end thereof through which a cassette can be inserted in said compartment, means forming an opening at one end of said compartment between said first and second sides through which a cassette in said compartment can be inserted and extracted, slide means, means mounting said slide means on said housing for movement between a first position and a second position displaced along the line parallel to said first and second sides, first motor means mounted on said housing, reciprocating means driven by said motor means and coupled to said slide means for moving said slide means between said first position and said second position, carriage means, means mounting said carriage means on said slide means for limited movement relative thereto, a pair of processing rolls, means mounting said processing rolls for rotation about parallel spaced axes on said carriage means, a drive gear mounted on one of said processing rolls, an output gear rotatably mounted on said housing and adapted to engage said drive gear when said slide is in said first position, second motor means mounted on said housing for driving said output gear, means mounted on said carriage means and adapted to engage a cassette and advance the cassette into said compartment when said slide means is moved from its second position to its first position, extractor means mounted on said carriage means and adapted to engage the cassette in said first position in said slide means to move said cassette out of said compartment when said slide means is moved toward its second position, guide means mounted on said carriage means, and means mounted on said housing and adapted to engage said guide means when said slide means is moved to its first position for moving said carriage means to a predetermined position relative to said compartment.

8. A cassette changing mechanism, comprising a housing, means forming a compartment in said housing adapted to receive a cassette, means forming an opening on one side of said housing through which one end of a cassette can be inserted, means forming an opening in one end of said housing through which a cassette can be withdrawn from said compartment, slide means, means mounting said slide means in said housing for movement between a home position and an extended position, reciprocating drive means mounted on said housing and coupled to said slide means and operable when energized to move said slide means from said home position to said extended position and back to said home position, carriage means, means mounting said carriage means on said slide means for limited movement with respect thereto, extractor means mounted on said carriage means and adapted to engage a cassette in said compartment in the home position of said slide means, a cassette engaging member mounted on said carriage means and adapted to engage a cassette and advance it into said compartment when said slide means is moved from its extended position towards its home position, a pair of processing rolls, means mounting said processing rolls on said carriage means for rotation about spaced parallel axes in position to receive a film unit advanced from a cassette in said compartment when said slide means is in said home position, guide means mounted on said carriage means, and means mounted on said housing and adapted to engage said guide means as said slide means is moved toward said home position for moving said carriage means to a predetermined position relative to said compartment.

9. Photographic apparatus, comprising, in combination, a housing, a slide, means mounting said slide on said housing for reciprocation between first and second positions, means forming a compartment in said housing adapted to receive a film cassette, means forming a hand grip on said slide, means forming a pair of upstanding ears on said slide, means forming an open slot on one side of each of said ears, means forming an aperture through one end of each of said ears, a carriage comprising a generally U-shaped frame having a pair of upstanding ears adapted to fit between said ears on said slide, a pin connected to each of said ears on said carriage frame and extending through said slots on said ears on said slide, means forming a dog on each of said ears on said carriage frame extending through a different one of said apertures in said ears on said slide, a pair of processing rolls journalled for rotation between said ears on said carriage plate, extractor means connected to each of said ears on said carriage plate, a slot formed in each of said ears on said carriage plate adapted to engage a pin and guide said carriage plate into a predetermined relation to the pin, and a pair of spaced pins mounted on said housing and adapted to engage said slots in said first position of said slide.

10. A slide assembly for a film processing and cassette changing mechanism, comprising, in combination, a frame, said frame comprising a plate having opposed ends extending normal to a central portion to form outstanding parallel ears, first and second processing rolls, means mounting said first roll between said ears for rotation about a fixed axis normal to said ears, a drive gear connected to said first roll, means mounting said second roll between said ears for limited translation toward and away from said first roll between a first position in engagement with said first roll and a position disengaged from said first roll and for rotation about axes parallel to said fixed axis, said ears further comprising portions extending normal to said axes, means forming open slots in said extending portions adapted to engage aligning pins, said central portion of said plate further comprising a portion on a side facing said extension that extends normal both to said central portion and to said ears, and resilient means extending between said frame and said second roll and urging said second roll toward said first roll.

11. The apparatus of claim 2, in which said means mounting said carriage means on said slide means comprises an adjustable stop mounted on said slide means and engaged by said carriage means in a position of said carriage means relative to said slide means that is determined by the extent of adjustment of said stop, and further comprising resilient means connected to said housing and adapted to engage said carriage means as said slide means approaches said first position to urge said carriage means into engagement with said stop.

12. The apparatus of claim 3, in which said guide means comprise means forming a pair of guide slots in said carriage means, and in which said last-recited means comprise a pair of locating pins located on said housing in positions adapted to enter said slots in said home position of said slide means, and a second pair of stops mounted in spaced relation on said housing and adapted to engage said carriage means at different points spaced from said slots.

13. The apparatus of claim 7, in which said means mounting said carriage means on said slide means comprises a stop, means adjustably mounting said stop on said slide means for engagement by said carriage means in a relative position of said carriage means and said slide means determined by the extent of said adjustment, and resilient means mounted on said housing and engaged by said carriage means as said slide means approaches said first position for urging said carriage means into engagement with said stop.

14. Apparatus for use with a front camera housing mounting an objective lens and having an opening through which scene light may be directed by the objective lens, said apparatus comprising:

a magazine having an opening and configured to initially retain a plurality of generally flat film cassettes in a stacked array with a forwardmost cassette aligned with said magazine opening;

means for releasably attaching said magazine to the front camera housing with its opening facing but out of registry with said front camera housing opening and with said stacked array of film cassettes extending on the opposite side of the front camera housing from said front camera housing opening and generally parallel to said magazine opening;

means within said magazine for urging the stacked array of film cassettes towards said magazine opening and serving to locate the forwardmost cassette at a given position laterally of the front camera housing opening when said magazine is attached to the front camera housing;

a slider;

means for mounting said slider for displacement between predetermined first and second positions relative to the front camera housing and said magazine and intermediate the front camera housing and said means urging the stacked array of cassettes toward said magazine opening; and means on said slider for engaging the forwardmost cassette located at said given position as said slider is displaced from its said first position into its said second position to cause the forwardmost cassette to be displaced from its said given position to another position wherein a film unit therewithin is located in operative relationship with the front camera housing opening to facilitate film exposure operations, and to cause the forwardmost cassette to be subsequently displaced from its said other position to a third position wherein it may be ejected from said apparatus, said stacked array urging means serving to automatically position the next forwardmost cassette in the stacked array at said given position upon ejection of the forwardmost cassette.

15. Apparatus for use with a front camera housing mounting an objective lens and having an opening through which scene light may be directed by the objective lens, said apparatus comprising:

a magazine having an opening and configured to initially retain a plurality of film cassettes in a stacked array with a forwardmost cassette aligned with said magazine opening;

a means for releasably attaching said magazine to the front camera hosuing with its opening facing but out of registry with said front camera housing opening;

means within said magazine for urging the stacked array of film cassettes towards said magazine opening and serving to locate the forwardmost cassette at a given position laterally of the front camera housing opening when said magazine is attached to the front camera housing;

a slider;

means for mounting said slider for displacement between predetermined first and second positions relative to the front camera housing and said magazine; and means on said slider for engaging the forwardmost cassette located at said given position as said slider is displaced from its said first position into its said second position to cause the forwardmost cassette to be displaced from its said given position to another position wherein a film unit therewithin is located in operative relationship with the front camera housing opening to facilitate film exposure operations, and to cause the forwardmost cassette to be subsequently displaced from its said other position to a third position wherein it may be ejected from said apparatus, said stacked array urging means serving to automatically position the next forwardmost cassette in the stacked array at said given position upon ejection of the forwardmost cassette, said attaching means being constructed to define the degree to which said magazine opening is out of registry with the opening of the front camera housing, and said predetermined first and second positions of said slider being selected, to locate a portion of the forwardmost cassette in overlying relationship with a portion of the next forwardmost cassette in the stacked array when the forwardmost cassette is in both its said other position and its said third position, the forwardmost cassette serving to preclude displacement of the next forwardmost cassette under the influence of said stacked array urging means when it is in its said other position and the next forwardmost cassette serving to exert an ejection force on the forwardmost cassette under the influence of said stacked array urging means when the forwardmost cassette is in its said third position.

16. Apparatus for use with a front camera housing mounting an objective lens and having an opening through which scene light may be directed by the objective lens, said apparatus comprising;

a magazine having an opening and configured to initially retain a plurality of film cassettes in a stacked array with a forwardmost cassette aligned with said magazine opening;

a means for releasably attaching said magazine to the front camera housing with its opening facing but out of registry with said front camera housing opening;

means within said magazine for urging the stacked array of film cassettes towards said magazine opening and serving to locate the forwardmost cassette at a given position laterally of the front camera housing opening when said magazine is attached to the front camera housing;

a slider;

means for mounting said slider for displacement between predetermined first and second positions relative to the front camera housing and said magazine; and means on said slider for engaging the forwardmost cassette located at said given position as said slider is displaced from its said first position into its said second position to cause the forwardmost cassette to be displaced from its said given position to another position wherein a film unit therewithin is located in operative relationship with the front camera housing opening to facilitate film exposure operations, and to cause the forwardmost cassette to be subsequently displaced from its said other position to a third position wherein it may be ejected from said apparatus, said stacked array urging means serving to automatically position the next forwardmost cassette in the stacked array at said given position upon ejection of the forwardmost cassette, wherein each of the cassettes includes an end cap which must be displaced from an initial light-sealing position to facilitate the removal of exposed film units therefrom and wherein said apparatus additionally includes means fixedly positioned with respect to the displacement of said slider for automatically effecting such a displacement of the end cap of the forwardmost cassette as the forwardmost cassette is advanced by said slider from its said given position into its said other position.

17. Apparatus for use with a front camera housing mounting an objective lens and having an opening through which scene light may be directed by the objective lens, said apparatus comprising;

a magazine having an opening and configured to initially retain a plurality of film cassettes in a stacked array with a forwardmost cassette aligned with said magazine opening;

a means for releasably attaching said magazine to the front camera housing with its opening facing but out of registry with said front camera housing opening;

means within said magazine for urging the stacked array of film cassettes towards said magazine opening and serving to locate the forwardmost cassette at a given position laterally of the front camera housing opening when said magazine is attached to the front camera housing;

a slider;

means for mounting said slider for displacement between predetermined first and second positions relative to the front camera housing and said magazine; and means on said slider for engaging the forwardmost cassette located at said given position as said slider is displaced from its said first position into its said second position to cause the forwardmost cassette to be displaced from its said given position to another position wherein a film unit therewithin is located in operative relationship with the front camera housing opening to facilitate film exposure operations, and to cause the forwardmost cassette to be subsequently displaced from its said other position to a third position wherein it may be ejected from said apparatus, said stacked array urging means serving to automatically position the next forwardmost cassette in the stacked array at said given position upon ejection of the forwardmost cassette, wherein each of the cassettes included in the stacked array includes a battery and exposed terminal means connected thereto and said apparatus additionally includes electrical contact means for extracting energy from the battery, said electrical contact means being fixedly mounted with respect to the displacement of said slider to automatically engage the exposed terminals of the forwardmost cassette when it is displaced by said slider into its said other position.

18. Apparatus for use with a front camera housing mounting an objective lens and having an opening through which scene light may be directed by the objective lens, said apparatus comprising;

a magazine having an opening and configured to initially retain a plurality of film cassettes in a stacked array with a forwardmost cassette aligned with said magazine opening, each of the film cassettes containing a plurality of film units of the rupturable pod self-developing type;

a means for releasably attaching said magazine to the front camera housing with its opening facing but out of registry with said front camera housing opening;

means within said magazine for urging the stacked array of film cassettes towards said magazine opening and serving to locate the forwardmost cassette at a given position laterally of the front camera housing opening when said magazine is attached to the front camera housing;

a slider;

means for mounting said slider for displacement between predetermined first and second positions relative to the front camera housing and said magazine;

means on said slider for engaging the forwardmost cassette located at said given position as said slider is displaced from its said first position into its said second position to cause the forwardmost cassette to be displaced from its said given position to another position wherein a film unit therewithin is located in operative relationship with the front camera housing opening to facilitate film exposure operations, and to cause the forwardmost cassette to be subsequently displaced from its said other position to a third position wherein it may be ejected from said apparatus, said stacked array urging means serving to automatically position the next forwardmost cassette in the stacked array at said given position upon ejection of the forwardmost cassette; and pressure applying means mounted on said slider to be operably disposed with respect to the film units as they are individually advanced from their cassette after exposure and with said slider disposed in its said second position.

* * * * *